Dec. 30, 1952    W. R. MEYER ET AL    2,623,429
WORK HANDLING APPARATUS FOR MACHINE TOOLS
Filed Jan. 10, 1951    8 Sheets-Sheet 3
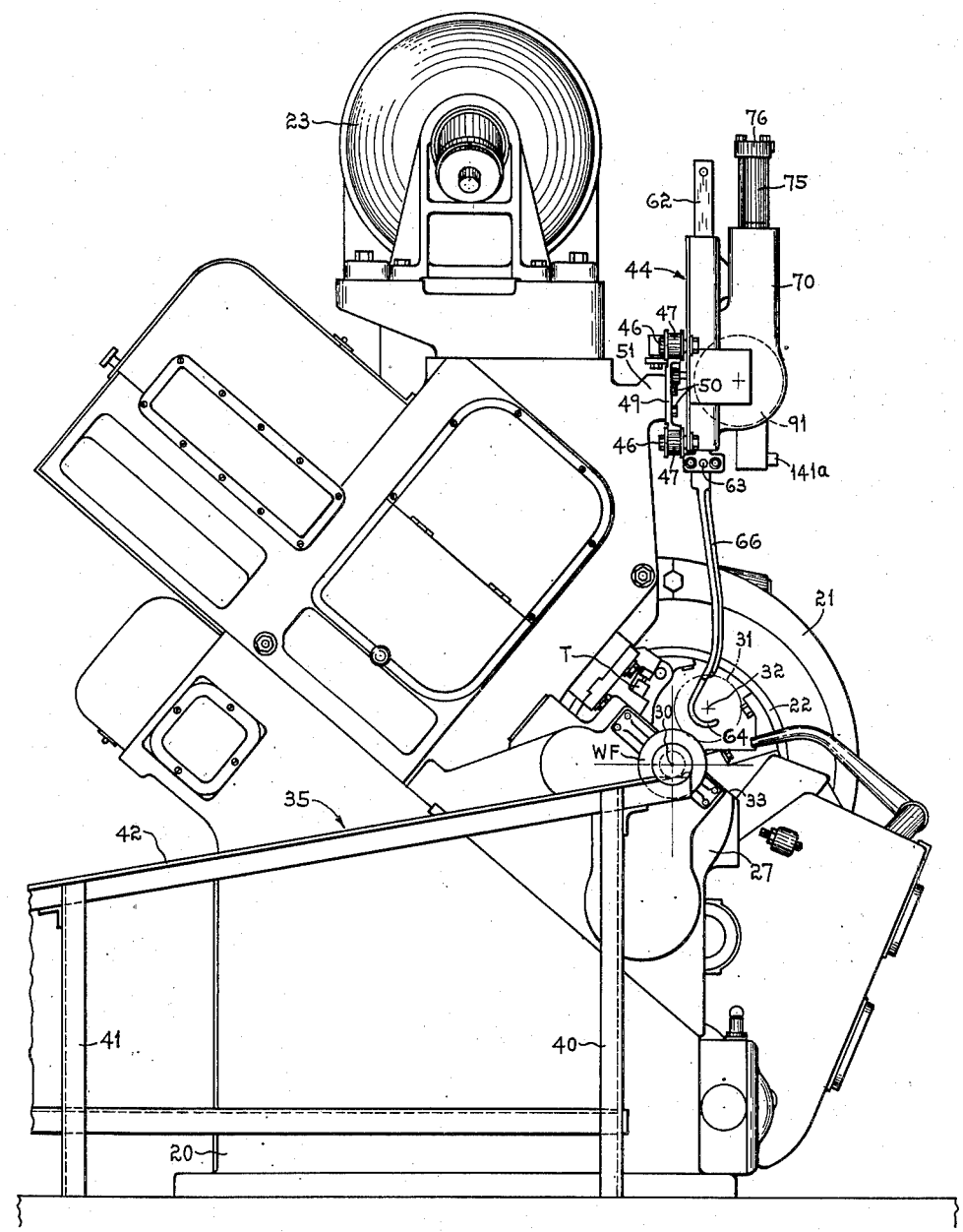
FIG. 3
INVENTORS.
WALTER R. MEYER AND
HAROLD J. SIEKMANN
BY
ATTORNEY.

Dec. 30, 1952   W. R. MEYER ET AL   2,623,429
WORK HANDLING APPARATUS FOR MACHINE TOOLS
Filed Jan. 10, 1951   8 Sheets-Sheet 4
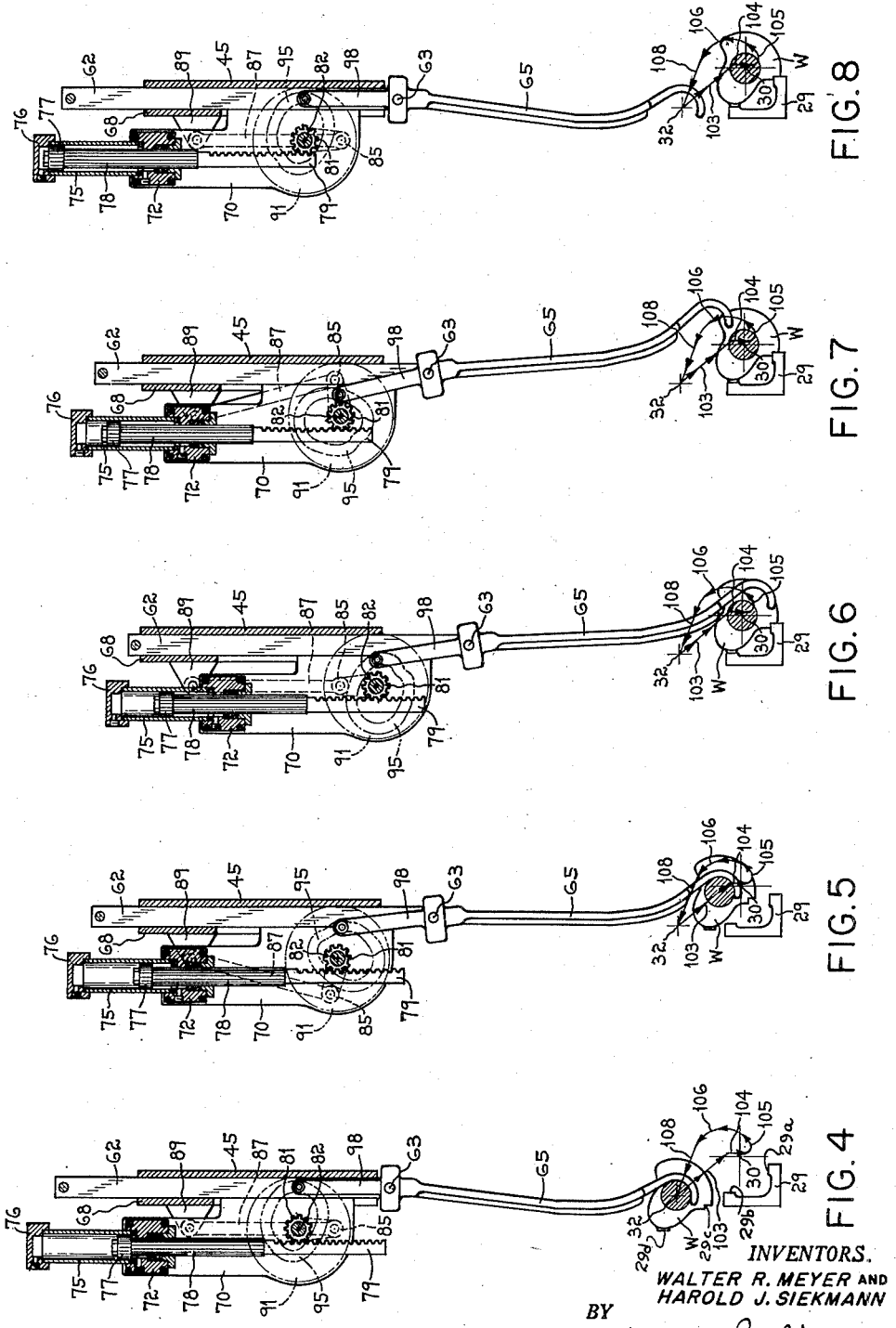
INVENTORS.
WALTER R. MEYER AND
HAROLD J. SIEKMANN
BY
Willard S. Grome
ATTORNEY.

Dec. 30, 1952 W. R. MEYER ET AL 2,623,429
WORK HANDLING APPARATUS FOR MACHINE TOOLS
Filed Jan. 10, 1951 8 Sheets-Sheet 5

INVENTORS.
WALTER R. MEYER AND
HAROLD J. SIEKMANN
BY
ATTORNEY.

Dec. 30, 1952   W. R. MEYER ET AL   2,623,429
WORK HANDLING APPARATUS FOR MACHINE TOOLS
Filed Jan. 10, 1951   8 Sheets-Sheet 8

INVENTORS.
WALTER R. MEYER AND
HAROLD J. SIEKMANN
BY
Millard L. Greene
ATTORNEY.

Patented Dec. 30, 1952

2,623,429

UNITED STATES PATENT OFFICE 2,623,429

WORK HANDLING APPARATUS FOR MACHINE TOOLS

Walter R. Meyer and Harold J. Siekmann, Cincinnati, Ohio, assignors to The R. K. Le Blond Machine Tool Co., Cincinnati, Ohio, a corporation of Delaware Application January 10, 1951, Serial No. 205,386

3 Claims. (Cl. 82—2.7)

This invention pertains to improvements in work handling apparatus for machine tools, and is particularly directed to improvements in mechanism for loading and unloading crankshafts in center drive crankshaft lathes.

One of the objects of this invention is to provide an improved automatic power operated work handling device for simultaneously loading and unloading work crankshafts in center drive crankshaft lathes.

Another object of this invention is to provide an improved automatic loading device for simultaneously removing finished crankshafts and placing unmachined crankshafts in center drive crankshaft lathes.

Another object of this invention is to provide improved work handling apparatus for center drive crankshaft lathes in which the operator need only present unmachined crankshafts to a loading rack and remove the finished crankshafts from an unloading rack while the entire loading and unloading of the crankshafts in the lathe is accomplished automatically by push button controlled mechanism.

Still another object of this invention is to provide an improved work handling mechanism for center drive lathes in which the operator plays no part in the lifting and axial movement of the crankshafts into and out of the center drive chuck of a center drive crankshaft lathe.

Another object of this invention is to provide an improved work handling device for center drive crankshaft lathe which is automatically operated by power to pick up unfinished crankshafts from a loading rack, deposit the crankshaft in the work spindle of the center drive crankshaft lathe and to at the same time remove a finished crankshaft from the center drive chuck and deposit it on an unloading rack, all of the aforementioned operations being accomplished automatically by push button control.

It is a further object of this invention to provide a loading apparatus for a center drive crankshaft lathe which operates in a timed automatic cycle with the operation of the various turning and chucking functions of the machine.

Still another object of this invention is to provide a work handling arrangement for a center drive crankshaft lathe in which rough crankshafts may be presented to and removed from operative position for presentation into the chucks of the center drive crankshaft lathe from a position to the rear of the machine.

It is also an object to provide a loading device for axially presenting work crankshafts into and removing them from a center drive crankshaft lathe in which a loading crane hook travels in a multiplicity of positively controlled paths in one direction for loading, and in the opposite direction for unloading work relative to the chucks and loading and unloading racks associated with the machine.

Also an object of this invention is to provide an automatic loading crane mechanism for a center drive crankshaft lathe which picks up and discharges crankshafts on respective loading and unloading racks from a position co-axial of the main axis of rotation of the lathe and to carry said crankshafts in a radially displaced position relative to the main axis of said machine axially into and out of the center drive chucks and to effect a deposition or removal of the crankshaft from the chucks by a multiplicity of radially disposed paths relative to the axis of rotation of the lathe.

Further features and advantages of this invention will appear from a detail description of the drawings in which:

Fig. 1a is a front view of the push button control station shown in Fig. 1.

Fig. 3 is a left hand end elevation similar to Fig. 2 showing the machine of Fig. 1.

Fig. 4 is a diagrammatic sectional view showing one of the loading cranes at the beginning of a loading cycle of a work piece in the center drive chuck, indicated by the line 4—4 in Fig. 1.

Fig. 5 is a similar view to Fig. 4, but showing the crankshaft about to be deposited in the center drive chuck.

Fig. 6 is a similar view to Fig. 4, but showing the position of the loading crane members at the time of deposition of the crankshaft in the center drive chuck.

Fig. 7 is still another diagrammatic view similar to Fig. 4, but showing the crane hook removing itself from under the crankshaft and starting in its upward stroke.

Fig. 8 is a final diagrammatic view similar to Fig. 4 showing the loading crane and hook returned to starting position ready to do an unloading operation.

Figure 1:
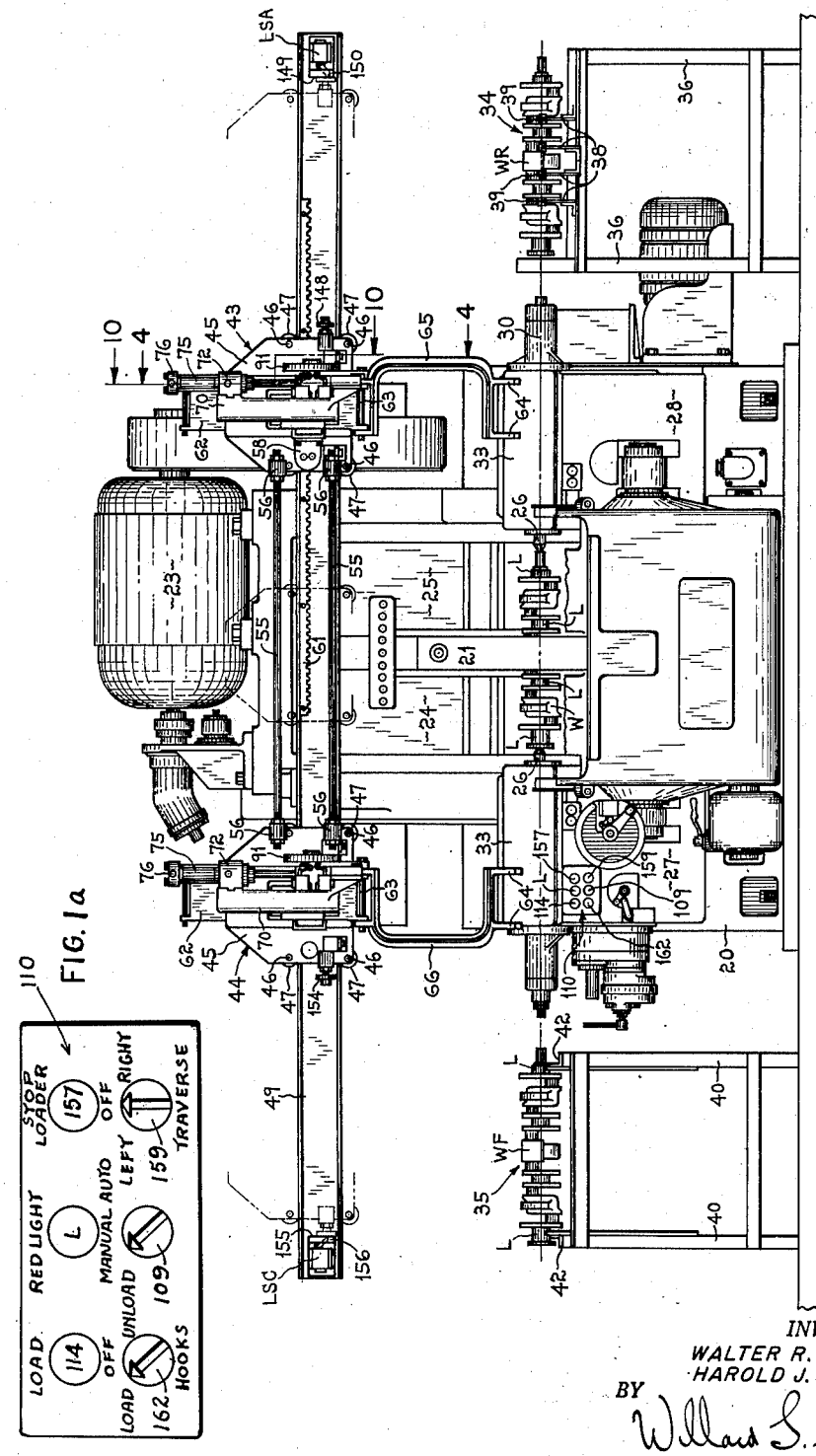
Fig. 1 is a front elevation of a typical center drive crankshaft lathe incorporating the novel features of the work handling apparatus of this invention.

For exemplary purposes this invention is shown applied to a conventional center drive crankshaft line bearing turning lathe such for example as illustrated in Patent 2,191,935 issued February 27, 1940. Such a lathe comprises a base 29 upon which is mounted the center drive ring gear chuck housing 21 having the rotatable center drive work spindle 22 which is driven by the usual main drive motor 23. Suitable tool carrier units 24 and 25 are provided each side of the center drive chuck having the usual cutting tools T for operating upon the line bearings L of a work crankshaft W, the crankshaft being supported at its ends upon centers 26 carried in the tailstocks 27 and 28 rigidly secured to the base 29 of the lathe.

The center drive work spindle 22 is provided with a suitable work gripping mechanism which usually comprises a fixed locating block 29 as best shown in Figs. 4 through 8 inclusive and which is located to one side of the main axis of rotation 30 of the center drive work spindle 22 and the centers 26 in the tailstocks 27 and 28. Suitable clamping mechanism is provided in the chuck in the center drive work spindle 22 which is preferably operated by power clamping and unclamping mechanism contained in the tailstocks 27 and 28 such for example as shown in Patent 2,473,103 issued June 14, 1949. The clamping mechanism is so organized in the chuck body that when unclamped, there is provided an axial passageway indicated at 31, Figs. 2 and 3, through which the crankshafts may be presented to or removed from the center drive work spindle 22 while maintained substantially on the axis 32 extending through the pasageway 31. The axis 32 also is arranged to pass well over the flat angularly disposed top surfaces 33 of each of the tailstocks 27 and 28 of the lathe. The center drive work spindles 22 are arranged to be stopped in accurate predetermined position to bring the access opening 31 always to the same point 32 for the aforementioned axial movement of the crankshafts into and out of the center drive chucks as by means of apparatus as set forth in Patent 2,192,437 issued March 5, 1940. Blocks 29 comprise the finished accurately located spots 29a and 29b which engage the spots 29c and 29d on the web of the crank shaft which are milled thereon before the crank shaft is brought to the machine.

The basic problem solved by this invention is to provide a loading mechanism which will take rough unmachined crankshafts which are delivered to a loading conveyor indicated generally at 34 and to lift them up from said conveyor 34 to a position on the axis 32 and then to move the rough crankshafts into the center drive chuck and deposit it downwardly again on the axis of rotation 30 of the lathe, where the workpiece is chucked and the cutting tools complete the machining operation on the line bearings L. The apparatus then is arranged to automatically remove the crankshaft from its position on the axis 30 again to the position 32 and then move it axially outwardly to an unloading conveyor indicated generally at 35. It is a further object while at the same time that a crankshaft is unloaded to the unloading conveyor 35 that an unmachined crankshaft is loaded into the center drive chuck as described, all of the aforementioned action being accomplished automatically by power controlled from a push button control station 110 conveniently located to the operator of the machine.

Figure 2:
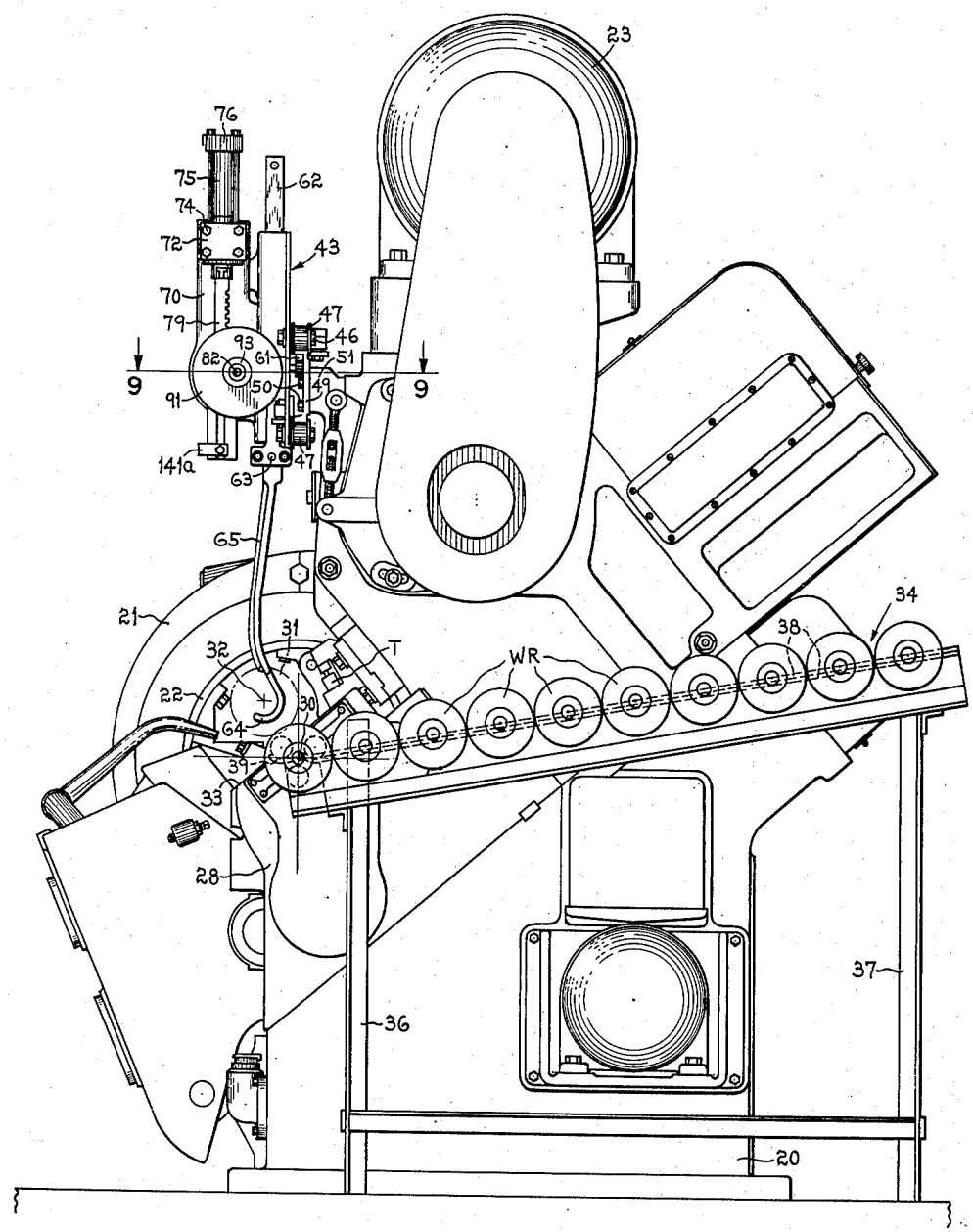
Fig. 2 is a right hand end elevation of the center drive crankshaft lathe and loading apparatus as shown in Fig. 1.
Figure 10:
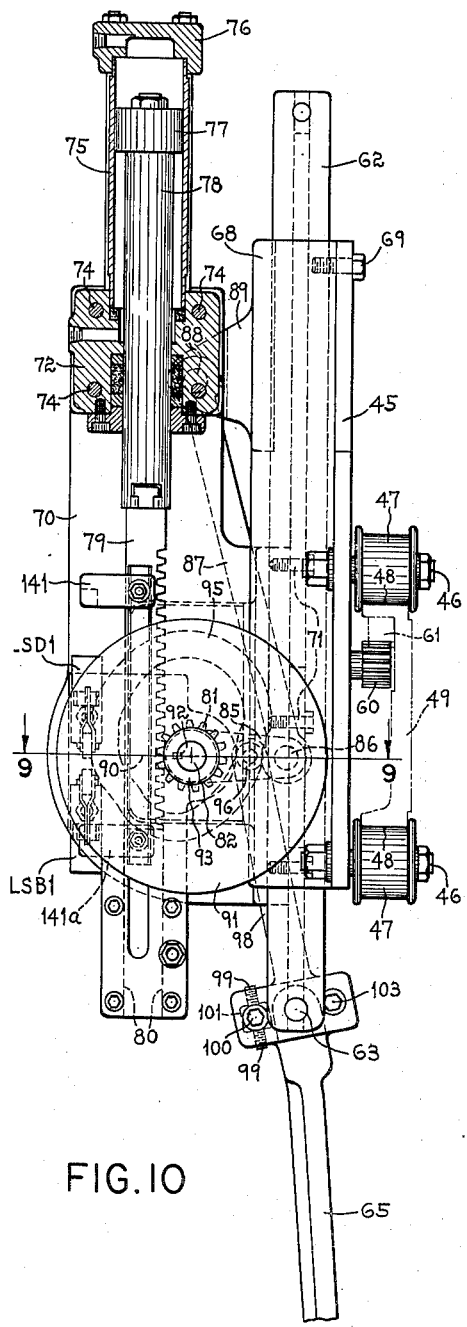
Fig. 10 is an enlarged sectional view on the line 10—10 of Figs. 1 and 11.
Figure 9:
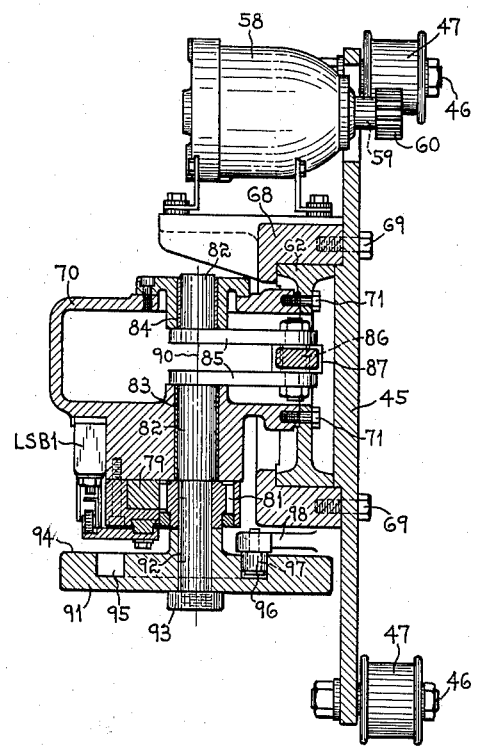
Fig. 9 is an enlarged sectional view through one of the loading cranes on the line 9—9 of Figs. 2 and 10.
Figure 11:
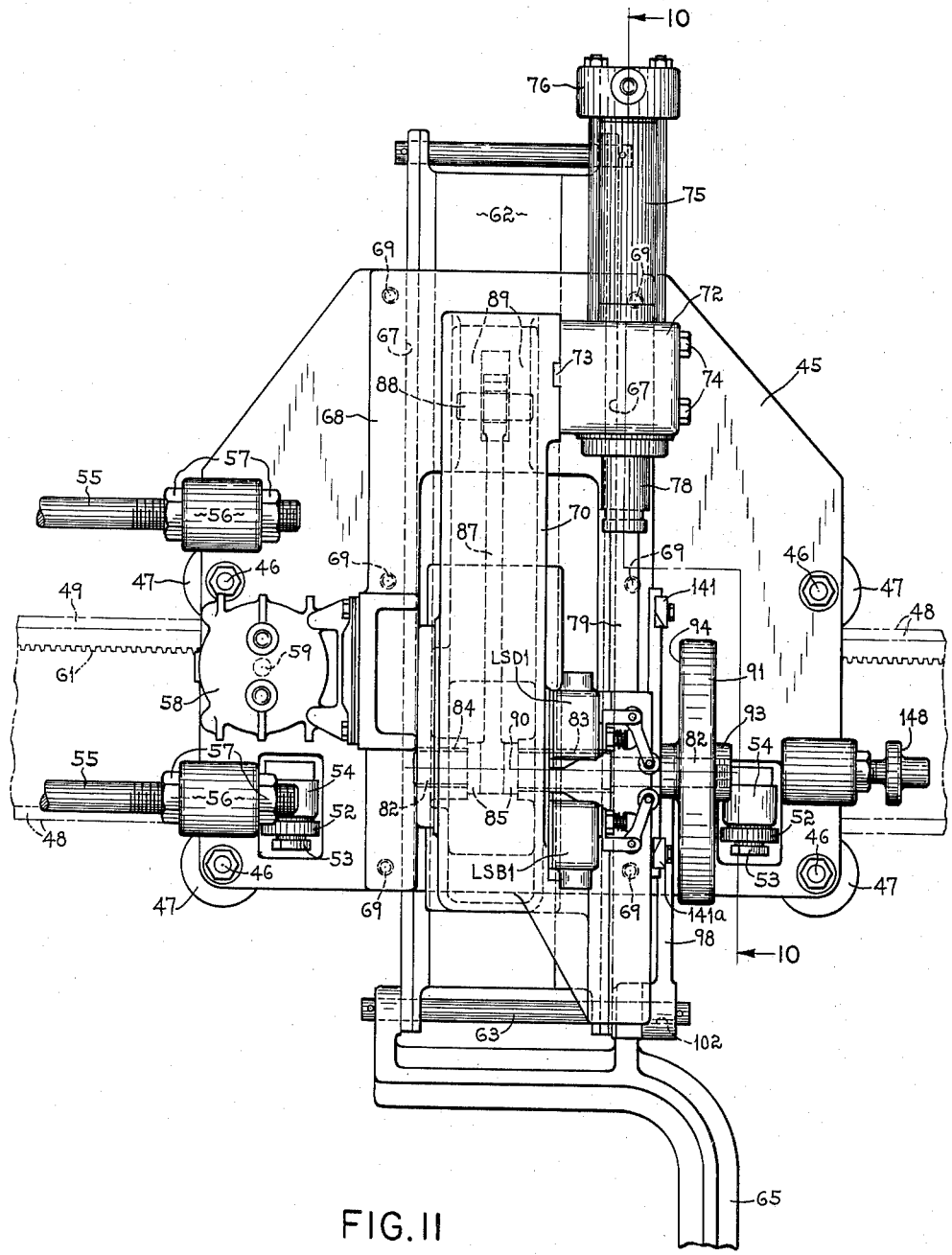
Fig. 11 is an enlarged fragmentary view of the right hand loading crane shown in Fig. 1.

Referring particularly to Figs. 1 and 2, at the right hand end of the machine there is provided a loading conveyor indicated generally at 34 comprising a frame having the front legs 36 and the rear legs 37 on top of which is mounted the downwardly inclined rails 38 which slope toward the front of the lathe and upon which are placed the rough unmachined crankshafts WR. Suitable curved hooked portions 39 are formed on the lower front ends of the tracks 38 so as to position each rough crankshaft WR in proper rotary indexed position substantially on the axis of rotation 30 of the lathe and to the right of the tailstock 28. On the left hand side of the lathe as best seen in Fig. 3, there is provided the unloading conveyor indicated generally at 35 consisting of the front legs 40 and rear legs 41 on top of which is rigidly mounted the rails 42 which extend downwardly to the rear of the machine and rollingly support the finished crankshafts on the end line bearings L when deposited on the unloading conveyor so that they automatically roll to the rear of the machine. To keep the machine in continuous operation so far as the workpieces are concerned, it is merely necessary to continue to place rough workpieces WR on the rear portions of the rails 38 where they slide downwardly to the front position on the axis 30 to be received by the loading apparatus to be described. Crankshafts are automatically received at the rear of the machine from the downwardly inclined rails 42 from which the finished crankshafts WF roll off and down to the back of the lathe. The operator of the lathe thus is free to devote his entire attention to an inspection of the tools and in measuring the workpieces coming from the machine and at no time is required to physically handle the crankshafts in any manner from the beginning to the end of the entire machining cycle.

To accomplish this desired end the loading mechanism comprises, in addition to the loading and unloading conveyors, a transporting conveyor comprising a pair of loading cranes indicated generally at 43 and 44 each of which cranes comprise a base plate member 45 having a series of studs 46 upon which are journaled the spool shaped rollers 47 which roll along on the guide surfaces 48 formed on the top and bottom edges of the channel iron rail or slideway 49 which in turn is fixed by suitable screws 50 to supporting bosses 51 formed rigidly with the machine's structure. Suitable additional eccentrically mounted side rollers 52 carried on eccentric studs 53 on brackets 54 secured to the plates 45 and engaging the surfaces 48 on the front of the channel 49 provide means for very accurately adjusting the rolling motion of the cranes 43 and 44 on the I beam without loss motion or play so that the units 43 and 44 are accurately guided on the fixed channel rail 49. The plate members 45 of the loading cranes 43 and 44 are rigidly connected together by means of the tie bars 55 which pass through the bosses 56 fixed to the plates 45 and are positively held in adjustable condition in the bosses by means of the adjusting jam nuts 57 so that both of the plates 45 of the crane members 43 and 44 roll along in horizontal movement in exact timed relationship to the rigid connection of the tie bars 55. The jam nuts 57 allow for relative horizontal adjustment between the two crane units for purposes of accommodation of various types of workpieces and tooling of the center drive lathe to which it is applied.

On one of the crane members, such as the member 43, there is provided a hydraulic or other suitable traverse motor 58 which is securely mounted to the plate 45 of the crane 43 and has a power output shaft 59 upon which is fixed the rack pinion 60 which in turn engages a rack 61 secured to the channel rail 49 so that upon the application of power to the motor 58 in one direction or the other, the loading cranes 43 and 44 may be traversed along the channel rail 49 to any desired position.

Each of the loading cranes 43 and 44 have depending swinging hooks which are pivotally mounted on reciprocatable slides 62 by means of the pivot shaft 63, and which hooks terminate in suitable work engaging hook members 64 which in this particular exemplary embodiment are adapted to engage around the intermediate line bearings L of the crankshafts W to hold the crankshafts in desired rotary indexed position. Each of the hooks are of C-shaped construction, the loading crane 43 having a right hand C-shaped portion 65 while the left hand loading crane 44 has the oppositely directed C-shaped member 66 so that both of the hook members may be inserted inside of the center drive chucks through the access opening 31 provided in the center drive chuck mechanism.

Since the apparatus for vertically reciprocating the slides 62 and for rocking the hook members 64—65 and 64—66 about their pivot shafts 63, a detailed description of one of the loading cranes, such as the crane 43, will suffice for both. The vertically reciprocating slide 62 is supported in suitable guideways 67 in the main support housing 68 which is securely mounted rigidly to the plate 45 by suitable bolts 69. Fixed to the slide member 62 is the bracket member 70 by suitable screws 71, upon the upper end of which bracket 70 is secured the cylinder head block 72 by means of a suitable tongue and keyway at 73 and the bolts 74. A cylinder 75 for vertical reciprocation of the hooks is securely mounted in the cylinder member 72 and terminates in a top cylinder cap 76. In this cylinder is reciprocatably mounted the piston 77 which is secured to the piston rod 78 which projects downwardly and is connected to a rack 79 supported in suitable guideways 80 formed on the housing member 70. The rack 79 engages a rack pinion 81 which is fixed on the crankshaft 82 journaled in suitable bearings 83 and 84 in the housing 70.

Fixed on the crankshaft 82 between the bearings 83 and 84 is the crankarm 85 which terminates in a crank pin 86 upon which is journaled the connecting rod 87 which extends upwardly and is journaled on a wrist pin 88 which is securely fixed to projecting bosses 89 formed integral with the main housing member 68. Thus by reciprocation of the piston 77 and rod 78 in the cylinder 75 by appropriate application of fluid pressure to said cylinder, the rack 79 rotates the crankshaft 82 and, since the connecting rod is rigidly held at its upper end on the wrist pin 88 the crankshaft 82 and its main axis of rotation 90 must necessarily be reciprocated in vertical movement as best illustrated diagrammatically in Figs. 4 through 8 inclusive.

Also fixed on the crankshaft 82 is means for simultaneously swinging the hooks about their pivot shafts 63 on the slides 62 simultaneously with and in a predetermined relationship to the vertical motion of the hooks. This apparatus comprises a disc cam 91 which is fixed on the crankshaft by a suitable key 92 and the clamp nut 93, the inner surface 94 of which cam is provided with a specially constructed cam groove 95 in which operates the cam roller 96 journaled on a pin 97 carried in the outer end of the actuating lever arm 98 which in turn is rigidly fixed to the crane hook members 65 and 66 through the medium of an adjustable connection comprising the abutment screws 99 carried in the hook members which engage an abutment stud 100 carried in a suitable boss 101 of the lever arm 98 which is journaled by suitable bearing portion 102 about the pivot shaft 63. A suitable clamp bolt is provided at 103 to rigidly secure the actuating lever 98 to the respective crane hook in the desired adjusted position as established by the mechanism thus described. Thus with this arrangement as the cylinder 75 actuates the rack 79 to rotate the crankshaft and thereby vertically reciprocate the bracket 70 and slide 62, the disc cam 91 is also rotated by the crankshaft in a predetermined timed relationship to the movement of the slide 62 so that the cam groove 95 actuating the roller 96 and the lever 98 causes the respective hook members 65 and 66 to swing about the pivot shafts 63.

Because of the combination of the use of the rack and pinion drive 79—81, the crankarm and connecting rod arrangement 85—87, and the cam and lever mechanism 91—98, each of the hooks 65 and 66 follow distinctive different paths when loading and when unloading crankshafts relative to the chuck and the loading and unloading racks 34 and 35 respectively. This is best illustrated by reference to Figs. 4 to 8 inclusive. In Fig. 4 is shown the loading cranes in upper position with the hooks located on the axis 32 for traversing the crankshafts lengthwise horizontally into and out of the center drive chucks and over or away from the loading and unloading racks. In this position the piston rod 78 and rack 79 are fully extended downwardly relative to the cylinder 75 as the piston and rod move upwardly the crankshaft 82 is rotated clockwise and reacting against the fixed wrist pin 88 through the connecting rod 87 causes the slide 62 and hook to move downwardly along the steeply inclined path 103 from the position 32 to the position 104, the rearward swinging motion to effect this combination diagonal downward movement of the hook is caused by the appropriate shaping of the cam groove 95 reacting with the roller 96 on the actuating arm 98 connected to the hook 65 as described. Further relative upward movement of the piston in the cylinder 75 and the changed configuration of the cam groove 95 causes the hook to move downwardly vertically from the point 104 to the bottom point 105 for either depositing the crankshaft W on the locating block 29 in the chuck or depositing the crankshaft on the unloading conveyor 35.

Continued relative upward movement of the piston in the cylinder 75 together with rotation of the cam 91 causes the hook to move in an arcuate backward and upward path from the point 105 to the point 106 whereupon final continued movement in this direction in conjunction with the effect caused by the cam groove 95, causes the hook to move in a more horizontal sloping direction 108 upwardly to return it again to the position 32, to thus remove the hook from position under the workpieces being deposited either in the chuck or on the unloading conveyor.

In order to remove the work from the chuck or to lift up an unfinished workpiece from the loading conveyor 34 the apparatus is operated in the reverse direction with the piston moving downwardly in the cylinder 75. The hook then follows a path from the position 32 diagonally rearwardly along the route 108 to the point 106 and then swings downwardly and forwardly in an arcuate path to the point 105 to position it under the workpiece in the chuck or on the load-conveyor. Final continued movement of the apparatus back to the position shown in Fig. 4, causes the hook to first move upwardly along the path 104 and then upwardly along the diagonal path 103 back to the position 32. Thus there is provided an arrangement for moving the hook in both vertical and side motion in a plurality of paths for both loading and unloading work relative to the machine members.

Figure 12:
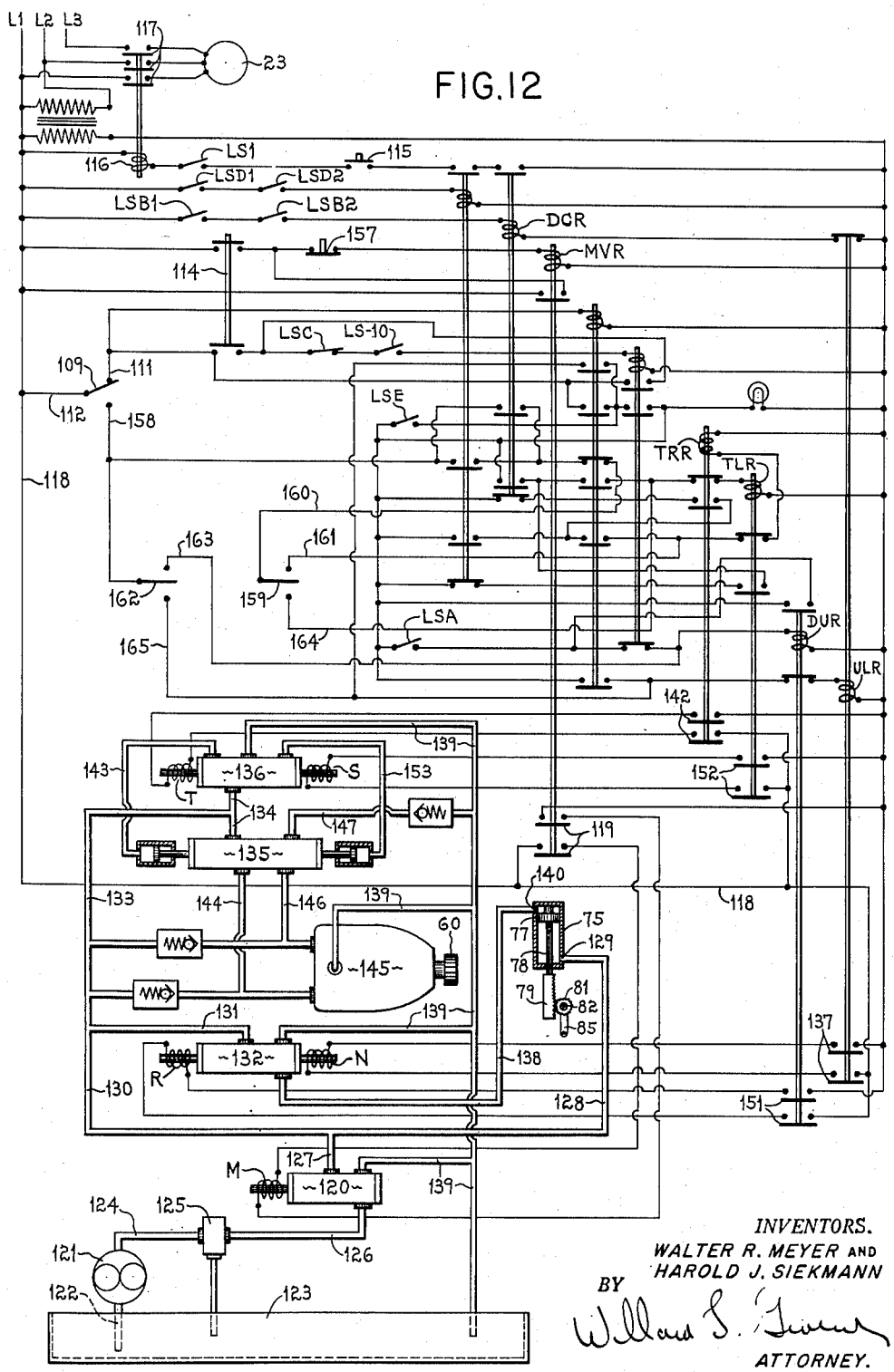
Fig. 12 is a diagram showing the electric and hydraulic control circuits and apparatus for the work handling mechanism.
Figure 13:
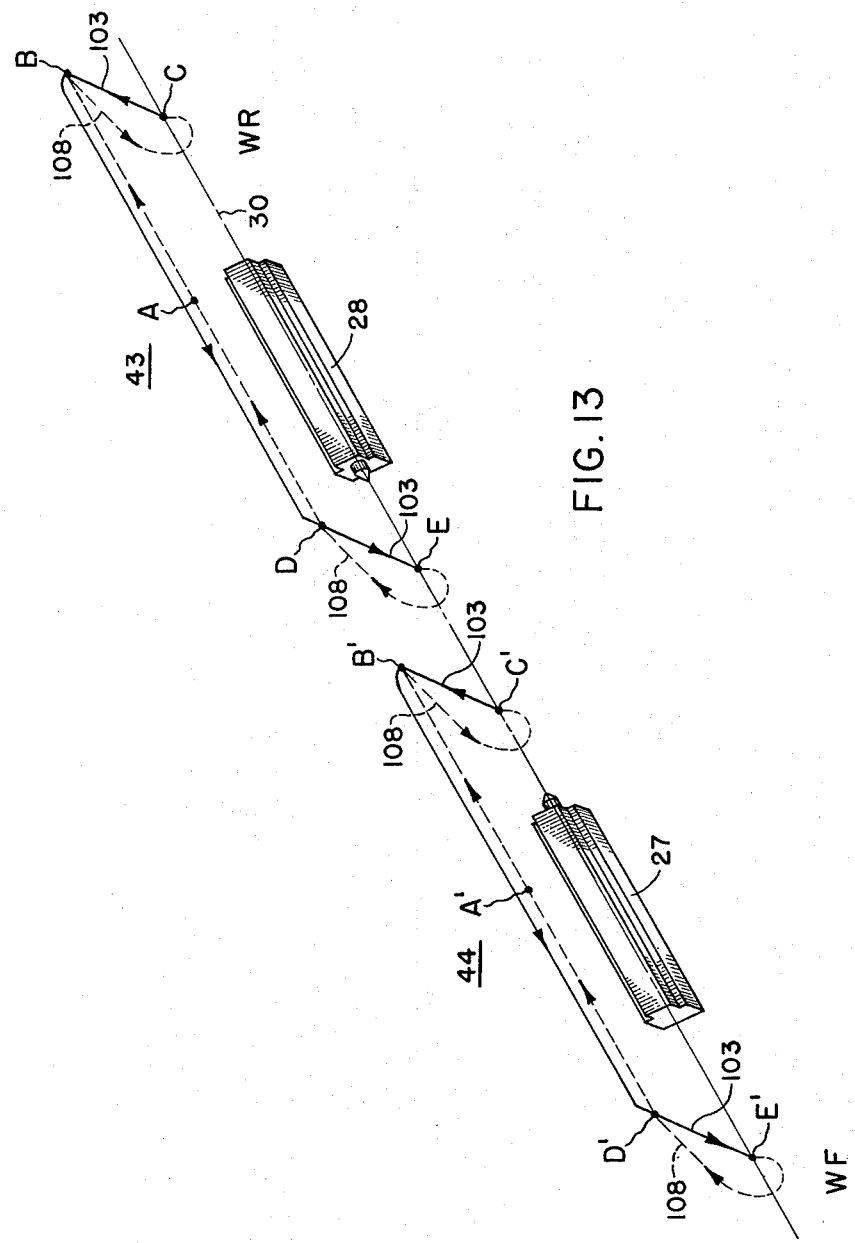
Fig. 13 is a diagram showing the paths of travel of the workpieces during the loading and unloading operations.

The operation of the machine in automatic sequence may best be understood by reference to Figs. 1, 12 and 13. Assume that the machine has completed the turning of the line bearings L of the crankshaft in the center drive chuck and has come to rest with the center drive work spindle and chuck in properly stopped indexed position as by means of the arrangement shown in Patent 2,192,437 cited above. The operator then applies the power chucking mechanism such as that shown in Patent 2,473,108 cited above to unclamp the chuck, leaving the power wrench mechanism in engagement with the chuck ready to clamp up the next rough unfinished crankshaft presented in the center drive spindle. The centers 26 are then removed from the ends of the crankshaft. The operator, with the selector switch 109, conveniently located at a suitable push button station 110 at the front of the machine, places the selector switch in automatic position 111 so as to interconnect lead 112 with lead 113. The operator then presses the load push button 114 to start the automatic loading cycle. At this moment the pair of loading cranes are in the rest or intermediate position as shown in Fig. 1 and at A and A' in Fig. 13 and a limit switch LS1 is contacted by a suitable trip dog on the member 43 so as to enable the operator to actuate the run and jog buttons 115 of the machine for energizing the main electrical circuit as represented by the relay coil 116 to close the main contactor 117 to apply power from the lines L1, L2 and L3 to the main drive motor 23 and hydraulic system of the lathe. As soon, however, as the loading cranes are moved to either side to B—B' or D—D', Fig. 13, of their central rest position A—A' during the turning cycle, the limit switch LS1 is opened to block out any operation of the main drive motor of the machine so that no misoperation or accident to the machine or the operator can occur. As soon as the load push button 114 is pressed power is applied from the lead 113 to the relay coil MVR which in turn closes the contacts 119 to thereby energize the solenoid coil M of the main hydraulic control valve 120 so as to apply fluid pressure from the fluid pressure pump 121, which receives a supply of fluid through the suction line 122 from the fluid reservoir 123, to the pressure line 124, through the pressure reducing valve 125 and the line 126, to the pressure supply line 127. One branch 128 of the pressure supply line 127 is permanently connected into the port 129 in the bottom or piston rod chamber portion of the cylinder 75. The other branch 130 of the line 127 is connected through a line 131 to the hoist control valve 132. Fluid pressure is also connected from the line 130 through the line 133 to the line 134 connected to the traverse control valve 135 and the pilot control valve 136. At this time relay ULR is energized to close contacts 137 and energize solenoid coil N of the valve 132. This connects line 138 to the drain line 139 and blocks the pressure line 131 at the valve 132 so as to apply pressure to the piston rod end of the cylinder 75 through the port 140 to hold the hooks in upper position B—A—D and B'—A'—D', Fig. 13, at the location 32 as described. At this time limit switches LSD1 and LSD2 mounted on the member 70 are engaged by the dogs 141 carried on the rack 79 of each crane to hold these limit switches closed. Under these conditions relay coil TRR is energized to close contacts 142 to energize solenoid coil T of the pilot valve 136 to apply pressure through line 143 to actuate the main traverse valve 135 to connect pressure from line 134 through line 144 to the traverse motor 145 and to connect discharge from this motor through the line 146 and the valve 135 to the drain line 147. This causes the motor pinion 60 to be actuated to move the cranes to the right A to B and A' to B' until the abutment screw 148 on the crane 43 engages the limit switch LSA and engages the abutment surface 149 of the abutment bracket 150 fixed to the rail 49. The cranes are held in contact with the surface 149 at B—B' by pressure maintained in the motor 145.

Closing of limit switch LSA energizes relay coil DUR to close contacts 151 to energize solenoid coil R of the valve 132 so as to connect pressure from the line 131 to the line 138 to apply pressure on the piston end of the cylinder 75 to cause the hooks to move along the unloading path B—B', 108, 106, 105, C—C', 104, 103, and B—B' as seen in Figs. 4 to 8 inclusive and Fig. 13. Under these conditions the left hand hook 66 picks out the finished crankshaft from the center drive chuck while the right hand hook 65 picks up a new rough crankshaft from the loading conveyor 34.

At the end of the unloading stroke, Fig. 4, limit switches LSB1 and LSB2 carried on the bracket member 70 are engaged by the dogs 141a carried on the rack 79 which causes relay coils DCR and TLR to be energized to close contacts 152 energizing solenoid coil S to the valve 136 to connect pressure through the pilot control line 153 to actuate the traverse valve to apply pressure from the line 134 to the line 146 and connect line 144 to the drain line 147 to cause the traverse motor 145 to move the cranes to the left from B—B' to D—D', Fig. 13. This motion continues until the abutment screw 154 on the crane 44 engages the limit switch LSC and the abutment surface 155 on the abutment block 156 fixed on the left hand end of the rail 49 at positions D and D'.

When limit switch LSC is closed, pressure from line 131 is cut off at the valve 132 while lines 138 and 139 are interconnected so as to apply pressure in the rod end of the cylinder 75, causing the hooks to now follow the loading path D—D', 103, 104, E—E', 105, 106, 108, and D—D' as shown in Figs. 4 to 8 inclusive and Fig. 13. Under these conditions the right hand hook 65 deposits a rough unfinished crankshaft in the center drive chuck while the left hand hook deposits the finished crankshaft on the unloading conveyor 35, both hooks finally returning again to the upper position 32 and D—D', Fig. 13.

When the hooks reach this up position D—D', limit switches LSD1 and LSD2 are actuated by dogs 141 to cause the traverse motor 145 to move the cranes to the right from D—D' to A—A'. This movement continues until limit switch LSE is actuated and opened which stops the cranes in the intermediate position shown in Fig. 1 and at A—A' in Fig. 13. When in this position, limit switch LS1 is closed by a suitable dog on one of the cranes to permit the main drive motor to operate and tools to feed into the machine the crankshaft in the center drive chucks. The loading cranes remain in this intermediate position A—A' during the machining operations. Limit switch LSE is opened when the cranes move from extreme right position to extreme left position.

Suitable interlock mechanism for actuating the limit switch LS10 of conventional design is preferably used to prevent any operation of the loading mechanism when the main drive and tool feed of the machine is operating. Whenever the stop loader button 157 is pressed, solenoid M of the valve 120 is deenergized to cut off pressure from the line 126 and to thus render the entire loading device inoperative.

For manual operation, the selector switch 109 is moved to manual position to connect lead 118 with lead 158. The load button 114 is pressed to energize solenoid M of the valve 120 to connect pressure to the loading device. The traverse selector switch 159 is then moved to right position to connect lead 160 with lead 161. At end of travel A—A' to B—B' to right, the hook selector switch 162 is moved to unload position to connect lead 158 to lead 163. To then traverse the cranes to the left from B—B' to D—D' the traverse selector switch 159 is moved to left position to connect lead 160 to lead 164. At the end of the left hand travel at D—D' the hook selector switch 162 is moved to load position to connect lead 158 to lead 165. The cranes are then moved to the right D—D' to A—A' to intermediate position of Fig. 1 by moving the traverse selector switch to right position.

The cranes are stopped in intermediate position A—A' by returning the traverse selector switch 159 to off position. The hook selector switch 162 is then also turned to off position and the cycle selector switch 109 is then place in automatic position to again restore the device to the above described automatic operation.

Having thus fully set forth and described this invention, what is claimed as new and desired to be claimed is:

1. In combination; a workholder for mounting an elongated work-piece for rotation, and a loading mechanism comprising a loading conveyor for conveying the work-piece to a position axially spaced from a mounted work-piece and with its axis parallel to the axis of the mounted work-piece, means along said conveyor for engaging said work-piece at at least spaced points relative to the central axis thereof to hold said work-piece in a predetermined rotative position, a transporting conveyor comprising a slideway extending parallel to the axis of said work-piece, a crane slidably mounted on said slideway for movement from said loading conveyor to said workholder, a hook, means mounting said hook on said crane for restricting it to swinging movement transversely of the axis of the work-piece for movement in a predetermined path into engaging and release positions with respect to a work-piece and for movement with said crane parallel to the axis of said work-piece, and power operated means for moving said hook in said predetermined path and for sliding said crane whereby said work-piece is precisely controlled and positioned by said loading mechanism.

2. In combination; a workholder for mounting an elongated work-piece for rotation, and a loading mechanism comprising a loading conveyor for conveying the work-piece to a position axially spaced from a mounted work-piece and with its axis parallel to the axis of the mounted work-piece, means along said conveyor for engaging said work-piece at at least spaced points relative to the central axis thereof to hold said work-piece in a predetermined rotative position, a transporting conveyor comprising a slideway extending parallel to the axis of said work-piece, a crane slidably mounted on said slideway for movement from said loading conveyor to said workholder, a hook, means mounting said hook on said crane for restricting it to swinging movement transversely of the axis of the work-piece and for movement in a predetermined path into engaging and release positions with respect to a work-piece and for movement with said crane parallel to the axis of said work-piece, power operated means for moving said hook in said predetermined path and for sliding said crane whereby said work-piece is precisely controlled and positioned by said loading mechanism, a second crane also slidably mounted on said slideway synchronized in its movements with said first-mentioned crane adapted to pick up and remove a finished work-piece from the workholder while the first-mentioned crane is picking up an incoming work-piece from the loading conveyor and transporting it to the workholder, and means for receiving the finished work-piece at a location away from the workholder at the time the incoming work-piece is being loaded into the workholder.

3. In combination; a workholder for mounting a crank shaft at angularly disposed spots thereon, and a loading mechanism for delivering the crank shaft to the workholder comprising a loading conveyor for conveying a crank shaft to a position axially spaced from the workholder and with its axis aligned with the axis of the workholder, means along the conveyor engaging pin bearings of different throws of the crank shaft to hold the shaft in position to be worked upon, a transporting conveyor comprising a slideway extending parallel to the axis of said workholder, a crane slidably mounted on the slideway for movement from said loading conveyor to said workholder, a hook, means mounting said hook on said crane for restricting it to swinging movement transversely of the axis of the crank shaft for movement in a predetermined path into engaging and release positions with respect to a crank shaft and for movement with said crane parallel to the axis of said crank shaft, and power-operated means for moving said hook in said predetermined path and for sliding said crane whereby said crank shaft is precisely controlled and positioned by said loading mechanism.

WALTER R. MEYER.
HAROLD J. SIEKMANN.

REFERENCES CITED

The following references are of record in the file of this patent:

UNITED STATES PATENTS

| Number | Name | Date |
|---|---|---|
| Re. 18,559 | Smith et al. | Aug. 8, 1932 |
| 1,422,140 | Sears | July 11, 1922 |
| 1,700,721 | Groene | Jan. 29, 1929 |
| 1,794,424 | Smith et al. | Mar. 3, 1931 |
| 1,841,988 | Smith et al. | Jan. 19, 1932 |
| 1,933,225 | Smith | Oct. 31, 1933 |
| 1,933,226 | Smith et al. | Oct. 31, 1933 |
| 1,950,040 | Smith et al. | Mar. 6, 1934 |
| 2,004,540 | Smith et al. | June 11, 1935 |
| 2,040,028 | Smith et al. | May 5, 1936 |
| 2,191,347 | Groene et al. | Feb. 20, 1940 |
| 2,221,049 | Groene et al. | Nov. 12, 1940 |
| 2,233,309 | Groene | Feb. 25, 1941 |
| 2,233,993 | Campbell | Mar. 4, 1941 |
| 2,305,868 | Groene et al. | Dec. 22, 1942 |
| 2,404,830 | Dempster | July 30, 1946 |
| 2,445,106 | Dempster | July 13, 1948 |